Sept. 12, 1933.　　H. D. HUME ET AL　　1,926,538
HARVESTING MACHINE
Filed Dec. 23, 1932　　2 Sheets-Sheet 1
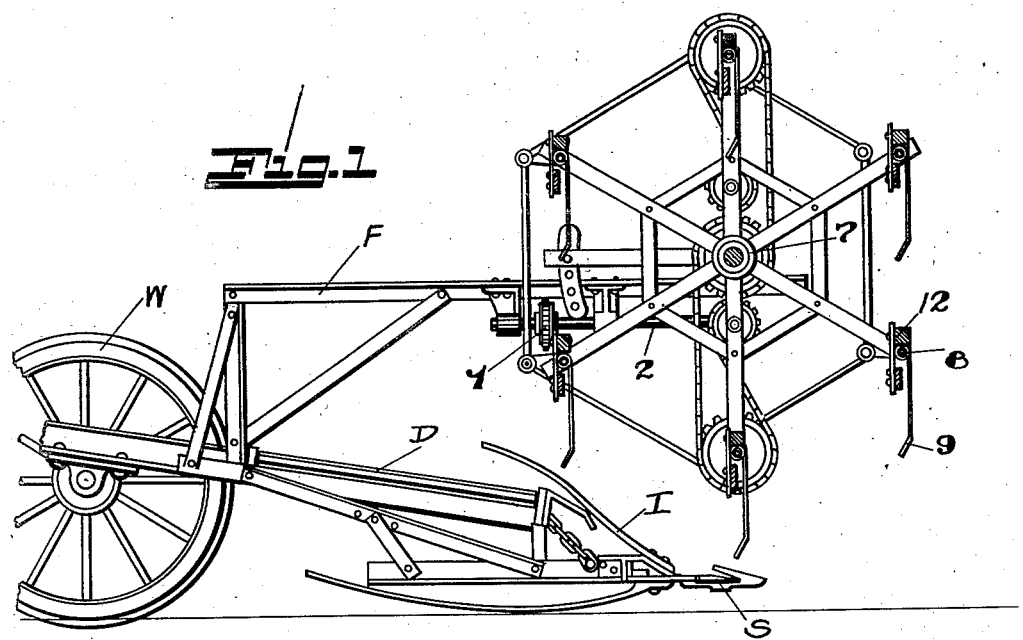
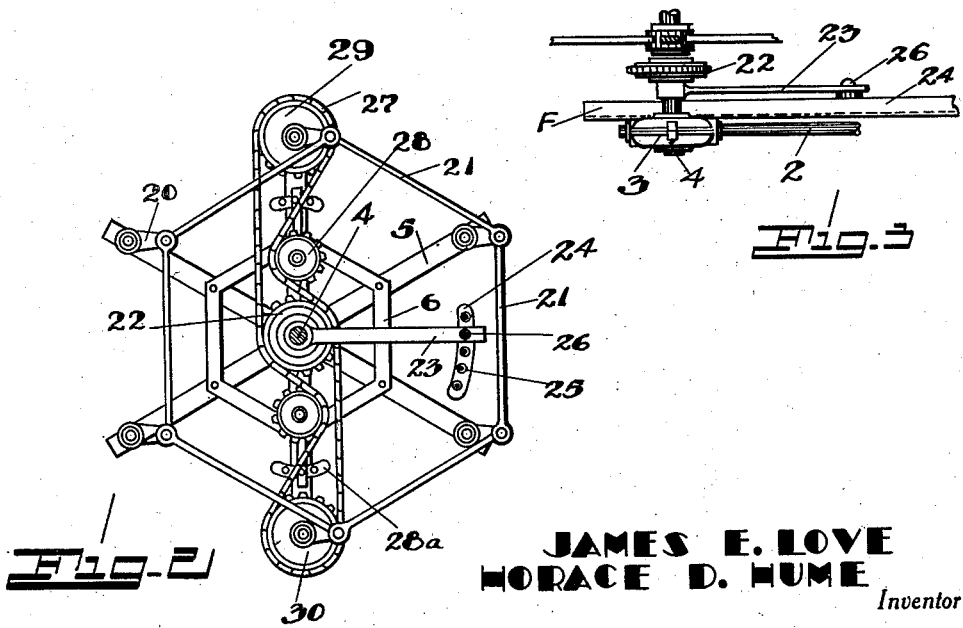
JAMES E. LOVE
HORACE D. HUME
*Inventor*
By *Herbert E. Smith*
*Attorney*

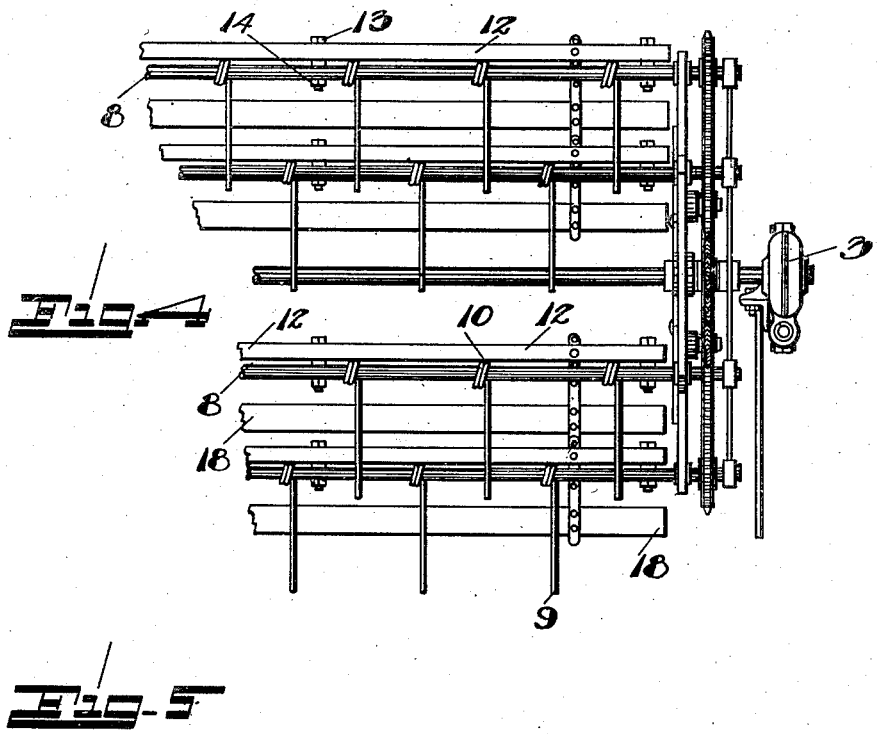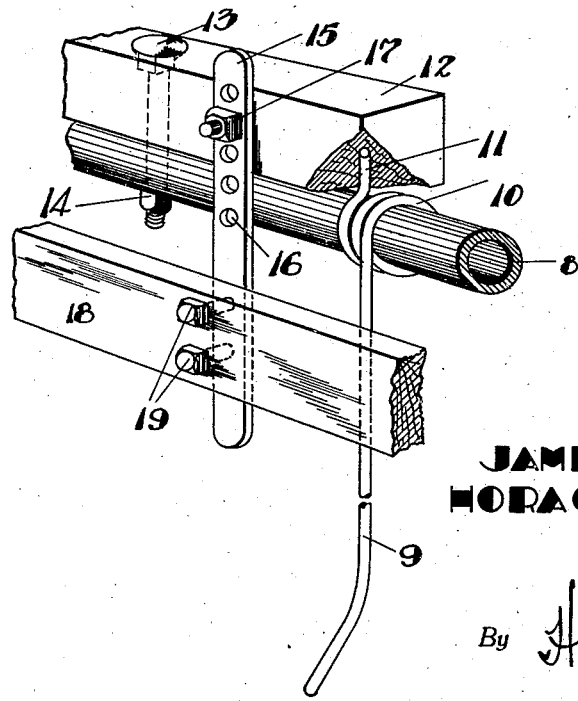

Patented Sept. 12, 1933

1,926,538

UNITED STATES PATENT OFFICE 1,926,538

HARVESTING MACHINE

Horace D. Hume and James E. Love, Garfield, Wash.

Application December 23, 1932
Serial No. 648,594

4 Claims. (Cl. 56—226)

Our invention relates to improvements in harvesting machines adapted for use in harvesting standing grains, and particularly for use in harvesting the crops of running vines, as pea vines. As is well known the pea vines lie close to the surface of the ground, and that these vines must be lifted, or gathered to upright position in order that the peas may be elevated above the cutter or sickle, and in order that the sickle may sever only the stems of the vines near the ground surface, leaving the cut vines with the crop of peas thereon. Under existing conditions, during the harvesting of the crop of peas, the farmer loses a considerable percentage of the peas, due to the inefficient operation of the reel, or other device that gathers the vines and presents them to the cutter or sickle.

Our invention is directed particularly to the construction and operation of the fingers or tines that are mounted on the reel that is located at the front of the harvesting machine and which revolves or rotates on a horizontal axis. In carrying out our invention we provide means involving a planetary system of sprocket-gearing for operating the tines or fingers of the reel, in order that all the fingers may remain in parallel planes, either perpendicular to the ground, or at an angle to the ground surface, and means are provided for adjusting the angular positions of the tines or fingers.

By thus adjusting the tines, and maintaining them in the same relative position at all times with relation to the growing vines, the latter may be picked up by the tines and the peas or crop elevated above the sickle; the vines are passed or conveyed to and over the sickle; and finally the harvested vines with their crop are passed to the transverse conveyer or draper, after which the threshing operation is started. The tines are thus automatically maintained in operative position at all times to insure maximum efficiency in presenting the gathered vines to the cutters, or sickle, with a minimum waste of the crop of peas.

Our invention consists in certain novel combinations and arrangements of parts involving the reel and its tines or fingers, as will hereinafter be more fully set forth and claimed. In the accompanying drawings we have illustrated one complete example of the physical embodiment of our invention wherein the parts are combined and arranged according to the best mode we have thus far devised for the practical application of the principles of our invention.

Figure 1 is a view of so much of a pea-harvesting machine as is necessary to illustrate the embodiment of our invention, the reel being shown in section, and the tines in their operative position.

Figure 2 is a sectional view of the reel, as at line 2—2 of Figure 4, showing the planetary system of sprocket gearing for continuously adjusting the tines or gathering fingers of the reel.

Figure 3 is a detail, top plan view, partly in section showing the stationary, central gear of the planetary system of gearing and the operating means for the reel shaft.

Figure 4 is a front elevation at one end of the reel.

Figure 5 is a detail sectional view in perspective, showing the manner of mounting the tines on the reel.

In order that the utility of the invention, the general arrangement and relation of parts may readily be understood we have shown in Figure 1 a portion of a pea harvester including the main frame F and one of the traction wheels W, together with the sickle S, which cuts off the vines, or their stems, close to the ground. The severed vines pass to the rear from the sickle over the incline I and are deposited on the transversely located, endless conveyor or draper D, which conveys the crop to the threshing mechanism of the harvester, not shown.

The reel is revolved or rotated on its horizontal axis, at the front of the machine, by suitable connections, as from one of the driving or traction wheels through sprocket wheel 1 and the power shaft 2, thence through a worm and worm gear in the gear case 3 which is supported on the frame F. The rotating reel that extends transversely of the harvester is mounted rigidly on its shaft 4 which is journaled in suitable bearings on the frame F and operated from the worm gear in the case 3, and the reel revolves clockwise in Figure 1.

The reel includes a pair of spaced heads or spider-frames 5, 5, one fixed at each end of the shaft 4, and these heads are made up of radially disposed arms, six in number, that are joined by braces 6, and secured to the hub member 7 on the shaft 4.

Near the ends of the arms of the two heads are journaled tubular shafts 8, said shafts extending from end to end of the reel and each shaft journaled at its ends in the heads of the reel. The tines 9, fashioned of wire, and resilient, are mounted on the tubular shafts between the heads and spaced at intervals as indicated in Figure 4.

A coil 10 is fashioned in each tine, and the coil is fitted about the shaft 8, as best seen in Figure 5, in order that the tine may give, or automatically adjust itself, when the free end of the tine encounters an obstruction, and this coil terminates in a fastening pin 11 at the end of the tine which pin is embedded in a cross bar 12 of the reel. These cross bars, at their ends, terminate inside the heads, that is, their ends terminate short of the adjoining heads, and the cross bars are rigidly secured on the shafts 8 by means of bolts 13 and nuts 14, as indicated in Figure 5. The tines are thus loosely mounted on the shafts 8, but rigidly attached to the cross bars 12, and the latter are rigidly attached to the shafts 8, and when the tines are adjusted to perpendicular position, as in Figure 1, the cross bars are located above the complementary shafts.

These cross bars 12 are also utilized for supporting the slats 18, one for each row of tines, and the slats, as usual, assist in gathering the vines and passing them to the rear. The slats are each supported from a cross bar by a pair of metal straps 15, and each strap is provided with a series of bolt holes 16 in order that it may be adjusted in its relation to the cross bar and the tines, and then secured to the cross bar by a bolt 17. The slats may be adjusted toward or away from the free ends of the tines, depending on the character of the vines to be harvested, and they are rigidly secured to the straps by a pair of bolts, as 19. The straps and the slats are of course located at the rear of the tines, to be effective in gathering the vines, and in order to permit the tines to have a free movement when encountering an immovable obstacle.

As best seen in Figure 2, each of the shafts 8 is provided with a crank arm 20, rigid with the shaft, and the adjoining crank arms are connected in pairs by means of pivoted links 21, in order that the rotary movement of the shafts 8, with relation to the reel, may be imparted from one shaft to another, and all of them move in synchronism in their bearings in the reel-heads.

For simultaneously and synchronously moving these shafts in their bearings we employ a planetary sprocket-gearing that is actuated from a central, stationary, or non-rotary, adjustable, sprocket gear 22 that is loosely mounted on the reel shaft, and in which the reel shaft revolves. This gear is carried at one end of an adjustable arm 23, extending rearwardly in horizontal direction, and the rear, free end of the arm is adjustable with relation to an arcuate plate 24 having a series of bolt holes 25. The arm 23 may be used as a lever for turning the gear 22 on the reel shaft as a pivot, for adjusting the tines in various angles to the ground surface, and by means of a bolt 26 the arm and the gear may be fastened in adjusted position. Thus, by lowering the rear end of the lever-arm 23 in Figure 1, the free ends of the tines 9 may be swung to the right, while by raising the free end of the lever arm, the tines, and their shafts 8 are swung to the left, to secure the desired adjustment.

Through the use of the central gear or sprocket wheel 22, rotary motion of the reel is transmitted to the shafts 8, and due to this motion of the shafts 8, cranks 20 and links 21, the tines are maintained in parallel planes, shown in Figure 1 as perpendicular to the ground surface. For transmitting the rotary movement from the reel to the shafts 8, we employ an endless sprocket chain 27 which engages the stationary gear 22 at two sides thereof, and also engages and passes over a pair of spaced guide sprocket wheels 28 that have adjustable bearings 28a for use in tightening or loosening the sprocket chain 27. At the ends of two of the radially alined arms 5, 5 of the spider frame or head are journaled power sprockets 29 and 30, and these sprocket wheels are rigid with and rotate with the shafts 8, 8 on which they are mounted.

Thus, as the reel revolves and carries with it the sprocket chain 27 the latter passes, around, and in mesh with, the stationary gear 22. The opposite flights of the chain, as they are laid on the central sprocket, convey power to the two operating sprockets 29 and 30 and their shafts 8, and these two shafts, through their crank arms, convey power to the links 21, thus transmitting the rotary movement to all of the shafts 8, and thereby maintaining the tines in parallelism at all times while the reel is rotating. In this parallel position, and after the desired adjustment to adapt the tines for a particular crop of vines, the tines are adapted to pick up, or gather substantially all of the vines within reach of the reel as the machine advances; propel the vines to the rear, over the sickle (where the stems are severed) and up the incline. At the upper end of the incline I the tines are lifted free from entanglement with the vines, and the latter are free to fall upon the draper D for conveyance to the thresher.

Having thus fully described our invention what we claim as new and desire to secure by Letters Patent is:—

1. The combination with a rotary reel, its shaft, and operating means therefor, of a series of parallel shafts journaled in said reel, a central sprocket gear loosely mounted on the shaft, a sprocket chain engaging opposite sides of said gear, a pair of operating gears for said chain mounted on opposed parallel shafts, crank arms on the parallel shafts, links connecting adjoining crank arms, a series of tines mounted on each parallel shaft, means for turning said central sprocket gear on its shaft to adjust the angle of said tines, and means for retaining said adjusting means in adjusted position.

2. The combination with a rotary reel and its shaft and operating means therefor, of a series of parallel shafts journaled in said reel and a series of tines mounted on each of said parallel shafts, a central sprocket gear loosely supported on the reel shaft, a lever arm rigid with the central gear, means for fastening said arm in adjusted position, a sprocket chain engaging opposite sides of said gear, a pair of operating gears for said chain mounted on radially opposed parallel shafts, crank arms on the parallel shafts, and a series of links pivotally connecting adjoining crank arms.

3. In a rotary reel of the type described, the combination with a rotary tine-shaft and a parallel bar rigidly connected therewith, of a tine having a resilient coil encircling said shaft, said tine having one end anchored to said bar, a cross slat for co-action with said tine, and means for suspending said slat from the bar.

4. In a rotary reel of the type described, the combination with a rotary-tine-shaft and a bar rigid therewith, of a series of spaced tines, each said tine having a resilient coil encircling the shaft and an end anchored in said bar, a pair of straps and a slat secured to said straps, and means for adjustably fastening said straps to the bar.

HORACE D. HUME.
JAMES E. LOVE.